METHOD OF AND APPARATUS FOR RECORDING

Filed June 18, 1958

INVENTOR.
GLENMORE L. SHELTON, JR.

Robert E. Sandt

BY AGENT

United States Patent Office 2,955,277
Patented Oct. 4, 1960

2,955,277

METHOD OF AND APPARATUS FOR RECORDING

Glenmore L. Shelton, Jr., Mahopac, N.Y., assignor to International Business Machines Corporation, New York, N.Y., a corporation of New York Filed June 18, 1958, Ser. No. 742,840

8 Claims. (Cl. 340—149)

This invention relates to magnetic recording and sensing methods and apparatus and more specifically to methods and apparatus for sensing images recorded on a record medium in magnetic ink.

A principal object of the invention is to provide an apparatus and method of detecting characters recorded in magnetic ink wherein the degree of resolution is materially improved.

A further object of the invention is to record on magnetically imprinted characters different frequencies in adjacent channels thereof, and to sense the thus recorded frequencies with a common sensing head and to separate the channels into separate output lines by means of frequency responsive filters.

A final object of the invention is to record in channels of a character recorded in magnetic ink alternate frequencies and to sense said frequencies by a plurality of sensing heads and discriminating between the adjacent channel signals by means of frequency responsive filtering devices.

Other objects of the invention will be pointed out in the following description and claims and illustrated in the accompanying drawings, which disclose by way of example, the principle of the invention and the best mode, which has been contemplated, of applying that principle.

The instant invention finds its most useful application in the field of machine character recognition, particularly where the characters are printed with inks having a pigment therein possessed of magnetic properties, such a pigment, for instance, as iron oxide. Known prior art devices of this type have characteristically employed reluctance sensing heads which detect the presence of the magnetic material in close proximity to the head gap. In order that a fine resolution be achieved by the prior art devices it became necessary to compact a large number of sensing heads in a very small width. As either the width decreased or the number of heads increased the problem of cross-talk and discrimination between adjacent channels became rather severe. With the instant invention the problem of cross-talk and discrimination between channels is largely eliminated and the signal from any one channel is free from interference of signals from adjacent channels.

Figure 1:
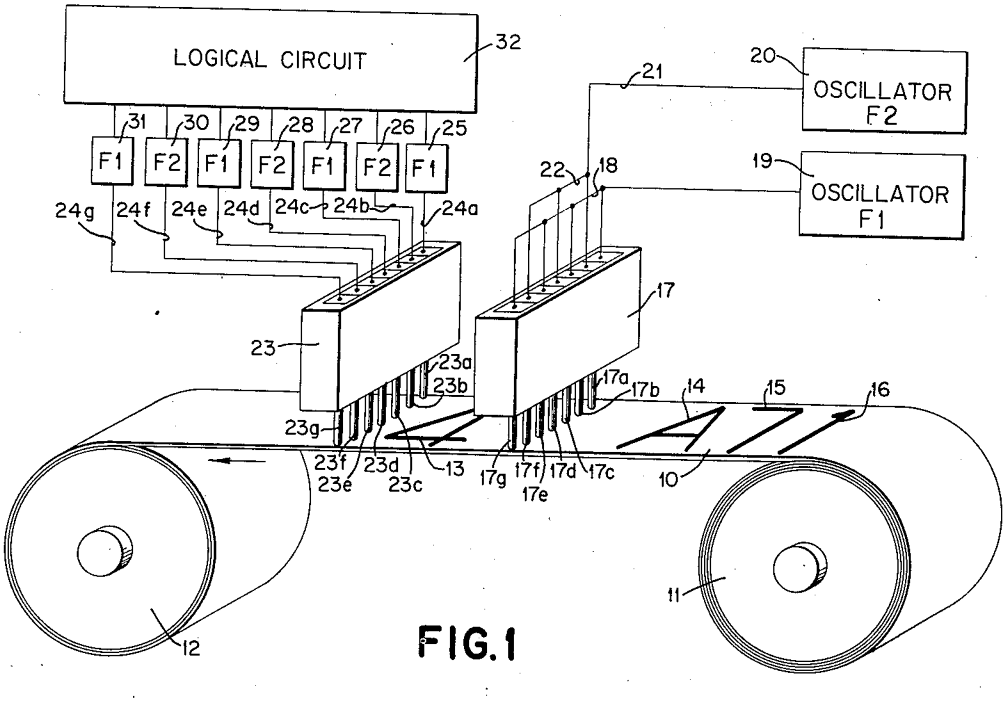
Fig. 1 is a schematic diagram of the apparatus for operating with alternating frequencies in adjacent channels.

In Fig. 1 there is shown a web 10 which is being fed from right to left from a supply reel 11 to a take-up reel 12 by means of any suitable feeding device which imparts a uniform linear movement to the web. Upon the web 10 are recorded characters 13, 14, 15, and 16, which characters can be any alphabetic or numeric characters. They can be visually observed and also susceptible to magnetic sensing by reason of the fact that the characters have been imprinted in a previous operation with an ink having iron oxide or some other suitable magnetic material as a pigment thereof. The web passes in intimate contact with a multi-channel write head 17, which head has 7 probes or writing gaps **17*a* to 17*g*, inclusive, each of the gaps being capable of generating an independent magnetic field under control of windings respectively associated therewith. Although the multi-channel head 17 has been represented as having a plurality of probes so as to bring out clearly the channel separation which would tend to be obscured by a showing of a conventional multi-gap head, it is to be realized that the head 17 would preferably be composed of a series of alternate laminations of magnetic material and non-magnetic material in close packed adjacency, the magnetic material having a minute air-gap adjacent to the record and a coil associated therewith. A suitable head for this application is shown in U.S. Patent 2,717,928 to H. W. Nordyke, Jr. In the head shown the windings associated with the probes 17*a*, 17*c*, 17*e*, and 17*g* are commoned by the external connection 18, which connection is fed from an oscillator 19. The oscillator 19 is of conventional construction and capable of producing a sinusoidal current to influence the appropriately connected windings of the write heads. The intervening heads 17*b*, 17*d*, and 17*f* are influenced by a second oscillator 20 via wire 21 and commoned connection 22 to each of the windings associated with these heads. Thus it will be seen from the foregoing description that as the web 10 with the characters 13, 14, 15, and 16 thereon traverses beneath the write head 17** there will be impressed on the fragmentary elements of each character a narrow band of alternate frequencies F1 and F2, F1 and F2 being suitably chosen so as to provide sufficient discrimination between channels.

Further appearing in Fig. 1 is the reading head 23, which head, like the write head 17, also has 7 probes or sensing gaps and 7 windings associated therewith. The head 23 and the head 17 are arranged in the path of the web feed so that each of the probes of the head 17 is aligned with the corresponding probe of the head 23, the individual heads of the head 23 being identified as **23*a* to 23*g*, inclusive. It is also to be noted that the heads 17 and 23 are arranged in very close proximity in the direction of the web feed so that any skew of the web does not adversely affect the reading. Each of the probes 23*a* to 23*g* has associated therewith a suitable winding which terminates in at least one wire 24*a* to 24*g*, inclusive. Each of the wires 24*a* to *g* is individually connected to filter circuits, 25 to 31** respectively, each of the filter circuits being of well-known construction.

Each of the above filters is designed to pass current of substantially one frequency only and to inhibit the flow therethrough of currents of all other frequencies. In the embodiment shown filters 25, 27, 29, and 31 are critically tuned to the frequency F1, whereas the filters 26, 28, and 30 are tuned to the frequency F2. The outputs of each of the foregoing filters 25 through 31, inclusive, are fed to a suitable logical circuit 32 which has the capability of analyzing the relative time displacement of the pulses in the adjacent channels and producing an output in accordance with the recognition. A logical circuit of this general type can be found for instance in U.S. Patent 2,615,992 to Flory et al. The logical circuit 32, however, forms no part of the instant tinvention and is therefore included schematically merely to provide a suitable receiving device for the information produced by the above-described apparatus.

Figure 2:
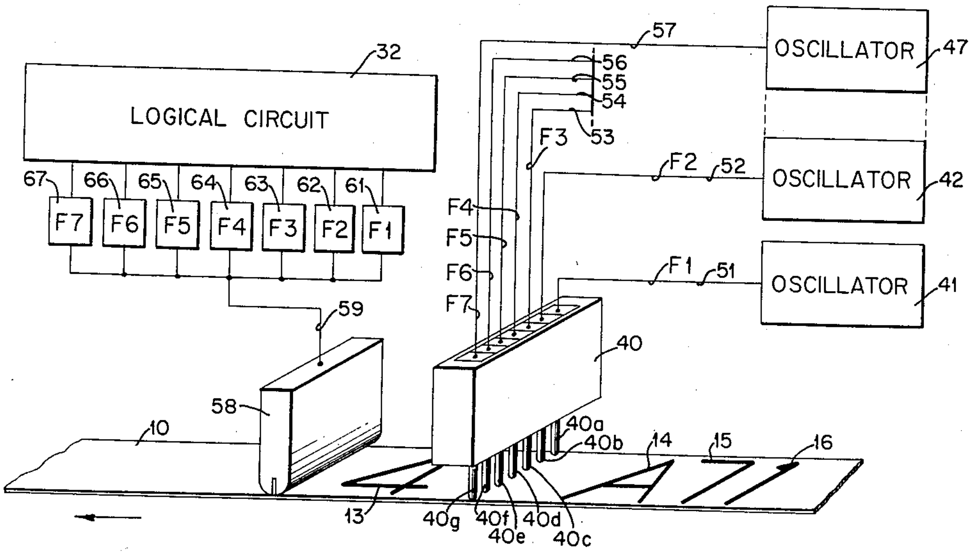
Fig. 2 shows the apparatus for operating with a different frequency for each channel.

In Fig. 2 is shown an alternative scheme which achieves the same interchannel discrimination by means of a multi-gap write head and a single gap read head, which reading head spans all of the channels. Specifically the web 10 in Fig. 2 is traversed from right to left by any suitable feeding means which imparts a substantially uniform translatory motion thereto. The characters 13, 14, 15, and 16 are recorded on the web 10 as hereinabove described. As the characters are moved past the write head 40 each of the discrete areas of magnetizable material constituting the outline of the character is exposed to the individual write heads 40*a* to 40*g*, inclusive, which heads are continuously energized by sinusoidal currents from the oscillators 41 through 47, of which oscillators only 41, 42, and 47 are shown. Each of the above oscillators is respectively connected by the wires 51 through 57 to the individual heads of the composite write head 40. The sinusoidal current produced by each of the oscillators is of a discrete frequency represented in the drawings by the designations F1 to F7. Thus by passage in contact with the write head 40 each character will have impressed thereon the frequencies F1 through F7 in narrow bands or channels wherever a fragment of the character is traversed by the corresponding write head. Further translation of the characters with the frequencies impressed thereon will influence the read head 58, which head has a single gap of a width sufficient to encompass the total height of the characters. The head 58 will act responsive to the magnetization of the characters passing therebeneath so as to produce on the line 59 a composite signal from all channels. This signal is fed to the filters 61 to 67, inclusive, which filters separate the signals from the respective channels and feed them to the logical circuit 32 which has the capability of recognizing the pulses introduced thereto and providing an output indicative of the character recorded as hereinabove described. Each of the filters 61 through 67 is again of the well-known type which will attenuate signals of all frequencies other than the critical frequency substantially undiminished.

From the foregoing descriptions of the apparatus of Figures 1 and 2 it will be seen that by use of distinct frequencies in adjacent channels the problem of cross-talk between adjacent heads is greatly reduced. In operational tests of apparatus embodying this multi-frequency principle, the signal response has been substantially sharper than in a simple multi-channel reluctance sensing device with no pre-recording of discrete frequencies on the characters. In both embodiments the close proximity of the write and read heads completely obviates the problem of tracking and skew which would be present if the pre-recording were affected as an incident to the printing of the characters themselves in a separate machine, as has sometimes been practiced in the prior art.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. Apparatus for deriving discretely timed electrical impulses indicative of the configuration of a character imprinted with a magnetic ink, comprising means for recording upon fragmentary portions of said character flux density variations of a plurality of predetermined frequencies, means for translating said recorded variations in flux density into a like plurality of alternating currents of the same predetermined frequencies, and means for separating said alternating currents into a plurality of character configuration manifesting output paths in accordance with the frequency thereof.

2. The apparatus in accordance with claim 1 which the means for recording of said flux density variations effects recording in parallel adjacent tracks.

3. Apparatus for driving discretely timed electrical impulses indicative of the configuration of a character imprinted with magnetic ink upon a record member comprising, means for imparting to said record member a uniform translatory motion, means for recording upon fragmentary portions of said character flux density variations of a plurality of predetermined frequencies in adjacent channels parallel to the direction of translatory movement, means for converting said recorded variations in flux density into electrical current variations which vary proportionately to the summation of all said variations in said recorded flux densities, and means for separating said alternating current into a plurality of components of said predetermined frequencies whereby said component currents of said predetermined frequencies manifest the configuration of said recorded character.

4. A device for producing discrete electrical impulses manifesting the configuration of a character imprinted with magnetic ink upon a record-bearing member comprising a recording station and a sensing station, means for presenting said character for seriate coaction with said recording station and said sensing station, means at said recording station for recording on a first plurality of predetermined fragmentary areas of said character magnetic flux density variations of a second plurality of predetermined frequencies, means at said sensing station responsive to said recorded flux density variations for producing electrical current variations corresponding thereto, and frequency responsive means connected to said means at said sensing station for separating said current variations into component signals corresponding in number to said first plurality, whereby said component signals manifest the configuration of said character.

5. The device of claim 4 wherein said first plurality of fragmentary areas is equal in number to said plurality of predetermined frequencies.

6. The device of claim 4 wherein said first plurality of fragmentary areas is greater in number than said second plurality of predetermined frequencies.

7. A device for producing discrete electrical impulses manifesting the configuration of a character imprinted with magnetic ink on a record-bearing member comprising a record-bearing member feeding means, a first multi-channel magnetic transducer located in the path of the feed of said character, a second multi-channel transducer in the path of the feed of said character and arrayed with respect to said first transducer so as to expose any given fragment of the character to successive coaction with a channel of said first transducer and a corresponding channel of said second transducer, a first oscillator connected to alternate channels of said first transducer and adapted to produce recording signals therein of a first predetermined frequency, a second oscillator connected to the intervening channels of said first transducer and adapted to produce recording signals therein of a second predetermined frequency, a plurality of electrical filter elements adapted to pass substantially undiminished electrical currents of said first predetermined frequency connected one each to the alternate channels of said second transducer, a plurality of electrical filter elements adapted to pass substantially undiminished electrical currents of asid second predetermined frequency connected one each to the intervening channels of said second transducer, and an output line connected to each of said filter elements, whereby the signals appearing on said output lines by virtue of their occurrence in point of time on the individual lines manifest the configuration of the recorded character.

8. A device for producing discrete electrical impulses manifesting the configuration of a character imprinted with magnetic ink on a record-bearing member comprising a record-bearing member feeding means, a first multi-channel magnetic transducer located in the path of the feed of said character, a second single channel transducer in the path of the feed of said character, a plurality of oscillators connected one each to the individual channels of said first transducer and adapted to produce therein recording signals of a single unique predetermined frequency in each channel, a plurality of electrical filter elements each adapted to pass undiminished currents of a different one of said predetermined frequencies connected to the single channel of said second transducer and an output line connected to each of said filter elements, whereby the signals appearing thereon by virtue of their occurrence in point of time on the individual lines manifest the configuration of the recorded character.

No references cited.